United States Patent
Ogura et al.

(10) Patent No.: US 12,105,460 B2
(45) Date of Patent: Oct. 1, 2024

(54) CLEANING BLADE, METHOD FOR MANUFACTURING CLEANING BLADE, AND IMAGE FORMING APPARATUS

(71) Applicant: Konica Minolta, Inc., Tokyo (JP)

(72) Inventors: Kunihiro Ogura, Hino (JP); Yuya Sato, Hino (JP); Shinichi Yabuki, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/452,187

(22) Filed: Aug. 18, 2023

(65) Prior Publication Data

US 2024/0077828 A1   Mar. 7, 2024

(30) Foreign Application Priority Data

Aug. 30, 2022 (JP) ................. 2022-136991

(51) Int. Cl.
  *G03G 21/00* (2006.01)
  *B32B 27/08* (2006.01)
  *B32B 27/20* (2006.01)
  *B32B 27/40* (2006.01)

(52) U.S. Cl.
  CPC ......... *G03G 21/0017* (2013.01); *B32B 27/08* (2013.01); *B32B 27/20* (2013.01); *B32B 27/40* (2013.01); *B32B 2264/1023* (2020.08); *B32B 2264/1024* (2020.08); *B32B 2264/104* (2013.01); *B32B 2432/00* (2013.01)

(58) Field of Classification Search
  CPC ............ G03G 21/0011; G03G 21/0017; B32B 27/08; B32B 27/20; B32B 27/40; B32B 2264/1023; B32B 2264/1024; B32B 2264/104; B32B 2432/00; B32B 2603/00; B32B 3/08
  See application file for complete search history.

(56) References Cited

U.S. PATENT DOCUMENTS

2014/0255070 A1* 9/2014 Tano ................. G03G 21/0017
                                                         399/350
2021/0325816 A1* 10/2021 Ogura ................ G03G 21/0011

FOREIGN PATENT DOCUMENTS

JP      2006-343411 A     12/2006

* cited by examiner

*Primary Examiner* — Sophia S Chen
(74) *Attorney, Agent, or Firm* — Lucas & Mercanti, LLP (57) ABSTRACT

A cleaning blade includes a contact layer that is in contact with a toner image carrier, and a support layer that joins to a support member, wherein the contact layer does not contain an inorganic filler, the support layer contains an inorganic filler having a thermal conductivity (λ) of 30 W/mK or more, and the average particle diameter of the inorganic filler is in a range of 0.1 to 5.0 μm.

8 Claims, 2 Drawing Sheets

CLEANING BLADE, METHOD FOR MANUFACTURING CLEANING BLADE, AND IMAGE FORMING APPARATUS

REFERENCE TO RELATED APPLICATIONS

The entire disclosure of Japanese Patent Application No. 2022-136991 filed on Aug. 30, 2022 is incorporated herein by reference in its entirety.

TECHNICAL FIELD

The present invention relates to a cleaning blade, a method for manufacturing the cleaning blade, and an image forming apparatus, and more particularly, to a cleaning blade and the like capable of reducing an increase in temperature due to rubbing of the edge, reducing an increase in vibration, further stabilizing the cleaning quality, and preventing breakage of the edge.

DESCRIPTION OF THE RELATED ART

A blade cleaning method has widely been used for cleaning a surface of an image carrier (photoreceptor) because it has a simple configuration and is excellent in cleaning such as removing toner and removing foreign substances. As the cleaning blade, a rubber elastic body, in particular, a polyurethane rubber having excellent wear resistance is often used.

Such a cleaning blade is constituted by a rubber member (elastic body) made of urethane rubber and a support member made of a steel plate in an electrophotographic printing method.

In recent years, due to an increase in process speed brought about by a higher speed of a copying machine and the pursuit of image quality, suppression of cleaning errors such as a toner slipping-through has been studied. Especially, the stabilization of the cleaning property in view of the environment is required, and while a cleaning blade which satisfies both environments of high-temperature and high-humidity environment and low-temperature and low-humidity environment is being studied, the filming in the high-temperature and high-humidity environment becomes a problem.

In a high-temperature and high-humidity environment, vibration at the edge becomes larger due to temperature rising caused by frictional heat between the edge of the cleaning blade that comes into contact with a photoreceptor and the photoreceptor, which affects the cleaning quality, and therefore, stabilization of the cleaning quality is required.

For example, JP2006-343411A discloses a technique in which, when running in contact with a photoreceptor, an edge chatters (vibrates) due to rubbing between the edge and a photoreceptor and an unpleasant sound (chattering sound) is generated, and therefore, a macro vibration is suppressed and the chattering sound is prevented by containing metal particles or metal oxide particles having a high specific gravity (2.8 to 8.9 $g/cm^3$ of the specific gravity) and a large average particle diameter (about 10 to 100 $\mu m$) in the elastic body of the cleaning blade.

When the specific gravity of the cleaning blade becomes heavier, the cleaning blade contributes to the prevention of the chattering sound, but in a high-speed machine such as a production print in which the transfer residual toner needs to be scraped off by the cleaning blade continuously for a long time, the edge of the blade generates frictional heat over a long time due to the contact with the image carrier, so that the rubber at the edge softens, the nip forming width increases, the linear pressure peak decreases, thereby the scraping function of the toner is remarkably deteriorated, and the edge is broken (fractured, chipped), and the like.

SUMMARY OF THE INVENTION

The present invention has been made in view of the above problems and situations, and a problem to be solved is to provide a cleaning blade capable of reducing an increase in vibration by reducing an increase in temperature due to rubbing of an edge, further stabilizing the cleaning quality, and preventing breakage of the edge, a method for manufacturing the cleaning blade, and an image forming apparatus.

In order to solve the above problems, the present inventors have found that, in the process of studying the causes and the like of the above problems, it is possible to provide a cleaning blade and the like in which a contact layer does not contain an inorganic filler, the contact layer being in contact with a toner image carrier and in which a support layer contains an inorganic filler having a high thermal conductivity and a specified particle diameter, the support layer joining to a support member, thereby reducing an increase in the temperature of an edge due to rubbing of the edge, reducing an increase in vibration, further stabilizing the cleaning quality, and preventing breakage of the edge, and the inventors have reached the present invention.

That is, the above problems according to the present invention can be solved by the following means.

To achieve at least one of the abovementioned objects, according to an aspect of the present invention, a cleaning blade reflecting one aspect of the present invention includes: a contact layer that is in contact with a toner image carrier; and a support layer that joins to a support member, wherein
the contact layer does not contain an inorganic filler,
the support layer contains an inorganic filler having a thermal conductivity ($\lambda$) of 30 W/mK or more, and the average particle diameter of the inorganic filler is in a range of 0.1 to 5.0 $\mu m$.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

The cleaning blade of the present invention is a cleaning blade having a contact layer that is in contact with a toner image carrier and a support layer that joins to a support member, characterized in that the contact layer does not contain an inorganic filler, the support layer contains an inorganic filler having a thermal conductivity (λ) of 30 W/mK or more, and an average particle diameter of the inorganic filler is in a range of 0.1 to 5.0 μm.

This feature is a technical feature common to or corresponding to the respective embodiment described below.

In an embodiment of the present invention, it is preferable that the inorganic filler is a non-oxide filler from the viewpoint of excellent heat dissipation.

In addition, it is preferable that the support layer contains the inorganic filler in a range of 2 to 15% by mass in order to improve heat dissipation and prevent poor dispersion with the resin in the support layer.

It is preferable that a tan δ peak temperature of the contact layer at a frequency of 1 Hz is in a range of −2° C. to 12° C. in view of the fact that the contact layer has low repulsion and a micro vibration of the cleaning blade can be suppressed.

It is preferable that the thickness of the support layer is in a range of 2 to 6 times the thickness of the contact layer from the viewpoint of having an appropriate strength.

It is preferable that the contact layer and the support layer contain polyurethane from the viewpoint of excellent strength and wear resistance, and good cleaning property.

The cleaning blade of the present invention can be manufactured by a known method. For example, in a step for forming the contact layer and the support layer, it is preferable to form a sheet using a centrifugal forming process. The obtained sheet is cut into a flat plate shape with a predetermined size, and is adhered to a support (metal fitting or the like) for attaching to an image forming apparatus by an adhesive or the like to obtain a cleaning blade.

As a result, the existence ratio of the inorganic filler contained in the support layer can be formed to be higher on the surface side than on the interface side with the contact layer, and a cleaning blade excellent in heat dissipation can be manufactured.

An image forming apparatus according to the present invention is characterized by including the cleaning blade described above. Accordingly, the cleaning blade is excellent in heat dissipation and the cleaning quality is stabilized, and thus an image excellent in image quality can be formed.

Hereinafter, the present invention, its components, and embodiments and aspects for carrying out the present invention will be described. In this application, "to" is used in the sense of including the numerical values described before and after "to" as a lower and an upper limit, respectively.

[Summary of Cleaning Blade of the Present Invention]

The cleaning blade of the present invention is a cleaning blade having a contact layer that is in contact with a toner image carrier and a support layer that joins to a support member, characterized in that the contact layer does not contain an inorganic filler, the support layer contains an inorganic filler having a thermal conductivity (λ) of 30 W/mK or more, and an average particle diameter of the inorganic filler is in a range of 0.1 to 5.0 μm.

In the present invention, "the contact layer does not contain an inorganic filler" means that an inorganic filler is contained in the contact layer in a small amount, for example, as an impurity, within a range that satisfies the requirements of the present invention and does not inhibit the effects of the present invention.

Figure 1:
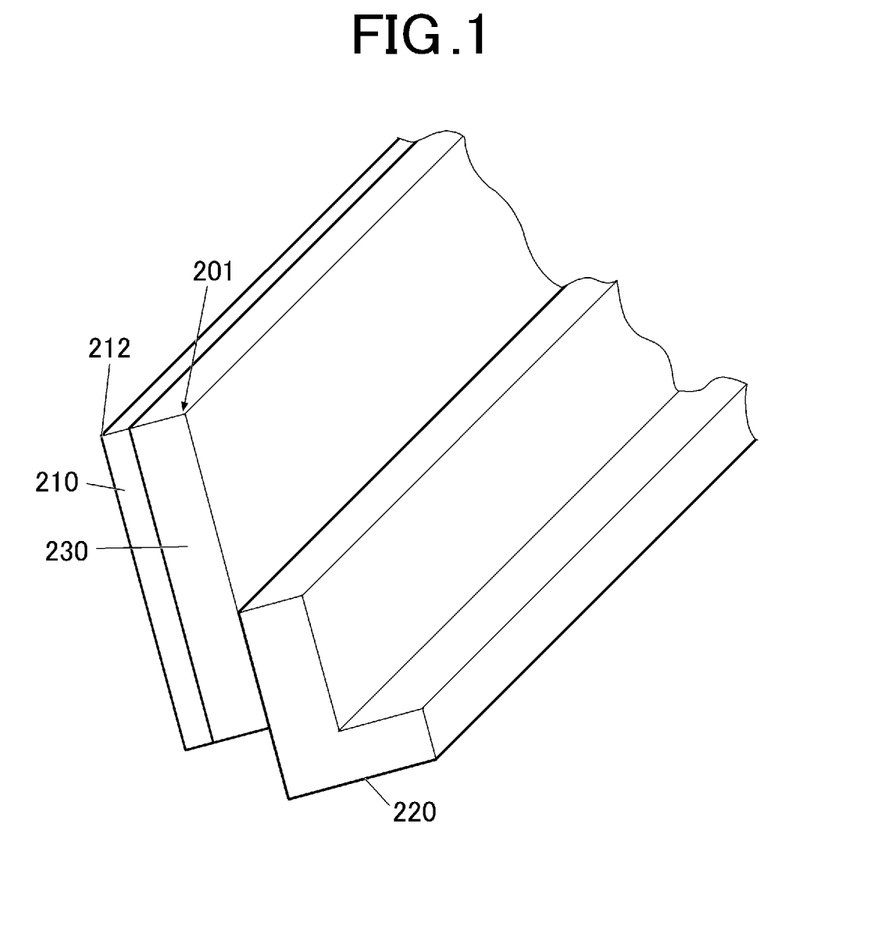
FIG. 1 is a schematic perspective view of a configuration of a cleaning blade according to the present invention.

Specifically, it means that an inorganic filler is not contained in a region of 50 μm from the edge of the contact layer (edge 212 in FIG. 1).

The presence or absence of the inorganic filler can be confirmed, for example, by observing the contact layer at 50 times or 100 times using a laser microscope.

<Thermal Conductivity (λ)>

The support layer according to the present invention contains an inorganic filler having a thermal conductivity (λ) of 30 W/mK or more.

The method of calculating the thermal conductivity is as follows.

A value measured with a commercially available thermal conductivity measuring device was used as the thermal conductivity of the particle, and LF/TCM FA8510B laser flash method thermal constant measuring device (manufactured by Rigaku Corporation) was used as the device and the value was determined in accordance with JIS R1611 (flash method).

A laser having the pulse width of 0.5 msec was used as the irradiated laser, the thermal response in the back surface of the sample was detected by the infrared detector, the thermal diffusivity of the sample was obtained by the half-time method, and the specific heat was obtained by the extrapolation method.

The measurement sample was shaped like a disk with a diameter of 10 mm and a thickness of 2 mm using a compression molding machine. The density was measured by the substitution method in water. The thermal conductivity (λ) was calculated using the sample density (ρ), the specific heat (Cp), and the thermal diffusivity (α) with the following equation. Note that the values in 300 K are used for all values.

Thermal conductivity calculation equation: $\lambda = \rho \times Cp \times \alpha$ Examples of the inorganic filler having a thermal conductivity (λ) of 30 [W/mK] or more include metal oxide fillers such as magnesium oxide, alumina (aluminum oxide), and beryllia (beryllium oxide), and non-oxide fillers such as hexagonal boron nitride (h-BN), aluminum nitride, silicon nitride, silicon carbide, and boron carbide.

Among these, alumina, boron nitride, aluminum nitride, silicon nitride, and silicon carbide are more preferable, and non-oxide fillers are particularly preferable, such as boron nitride, aluminum nitride, silicon nitride, and silicon carbide.

These inorganic fillers may be used singly or in combination of two or more thereof.

Commercial products of the inorganic filler can be obtained from Ishihara Chemical Co., Ltd., Tokuyama Corporation, Showa Denko Co., Ltd., Shin-Etsu Chemical Co., Ltd., Denka Co., Ltd., Kanto Chemical Co., Inc., Kojundo Chemical Laboratory Co., Ltd., Fujifilm Wako Pure Chemical Corporation, Sumitomo Chemical Co., Ltd., Sumitomo Osaka Cement Co., Ltd., Merck Co., Ltd., and the like.

The non-oxide filler is preferably contained in the support layer in an amount of 2 to 15% by mass, and more preferably in an amount of 5 to 12% by mass.

<Average Particle Diameter>

The average particle diameter of the particles of the inorganic filler is in a range of 0.1 to 5.0 μm, more preferably in a range of 0.3 to 3 μm.

The measurement of the average particle diameter (number average primary particle diameter) of the particles of the inorganic filler can be calculated as follows.

The number average primary particle diameter of the inorganic filler contained in the support layer can be measured by observing a cross section of the support layer with an electron microscope. Specifically, the cross section of the support layer is photographed by a scanning potential microscope (for example, "JSM-7401F" (manufactured by JEOL Ltd.)), at a magnification of, for example, 40,000 times, and 100 particles other than the aggregated particles are randomly taken into the scanner. The obtained photographic images were analyzed using an automatic image-processing analyzer (LUZEX AP (manufactured by Nireco Corporation)) to determine the particle diameter as (long diameter+ short diameter)/2, and the average of 100 particles was defined as the number average primary particle diameter of the inorganic filler.

<Tan δ Peak Temperature>

In the cleaning blade of the present invention, a tan δ peak temperature of the contact layer at a frequency of 1 Hz is preferably in a range of −2° C. to 12° C.

The loss tangent (tan δ) was measured using a dynamic viscoelasticity measuring device (viscoelasticity analyzer RSA-G2, manufactured by TA Instruments). First, a sample of the contact layer was fixed to the dynamic viscoelasticity measuring device so that the measuring length was 30 mm. After that, a sine wave distortion having a displacement amplitude of 10 μm and a frequency of 1 Hz is applied to the sample, and the loss tangent is measured in a temperature range of minus 10° C. to 54° C. at a temperature rise of 2° C. steps, and the temperature at which the loss tangent is maximized is defined as a tan δ peak temperature.

Here, the "loss tangent tan δ" is a physical property expressed by a ratio (G"/G') of a loss elastic modulus G" and a storage elastic modulus G'.

In general, the storage elastic modulus G' (unit Pa) represents elasticity and is an index of the force to be stored to return when deformed by an externally received force. That is, G' is the elastic response component of the elastic modulus in the relation of the stress generated against deformation when it deforms, and the energy for the deformation work is stored.

On the other hand, the "loss elastic modulus G" (unit Pa)" represents viscosity, and is an index of a force that follows a force received when deformed by an externally received force and loses as heat.

In addition, "loss tangent tan δ" is an index indicating a balance between viscosity and elasticity. That is, tan δ is a measure of the ratio of loss and storage of the energy for the deformation work.

Further, the "tan δ peak temperature" is a temperature at which tan δ is maximized, and corresponds to a glass transition temperature.

In general, the higher the tan δ peak temperature of the urethane, the lower the repulsion elasticity. By setting the tan δ peak temperature at a frequency of 1 Hz in a range of −2° C. to 12° C., a low repulsion contact layer can be obtained. Thus, it is possible to suppress the micro vibration of the cleaning blade.

That is, when the tan δ peak temperature is −2° C. or more, adhesiveness of the blade to the counterpart material (image carrier) is ensured, so that the risk of remaining of wiping can be reduced.

When the tan δ peak temperature is 12° C. or less, the blade has an appropriate restoring force, and extension caused by being pulled at the contact part can be suppressed, and fracture and breakage can be suppressed, so that the life of the blade can be extended.

In order to set the tan δ peak temperature within the above range, for example, the temperature can be adjusted by changing a kind of the material and the addition amount of the polyurethane.

Hereinafter, the configuration of the cleaning blade according to the present invention will be described.

Figure 2:
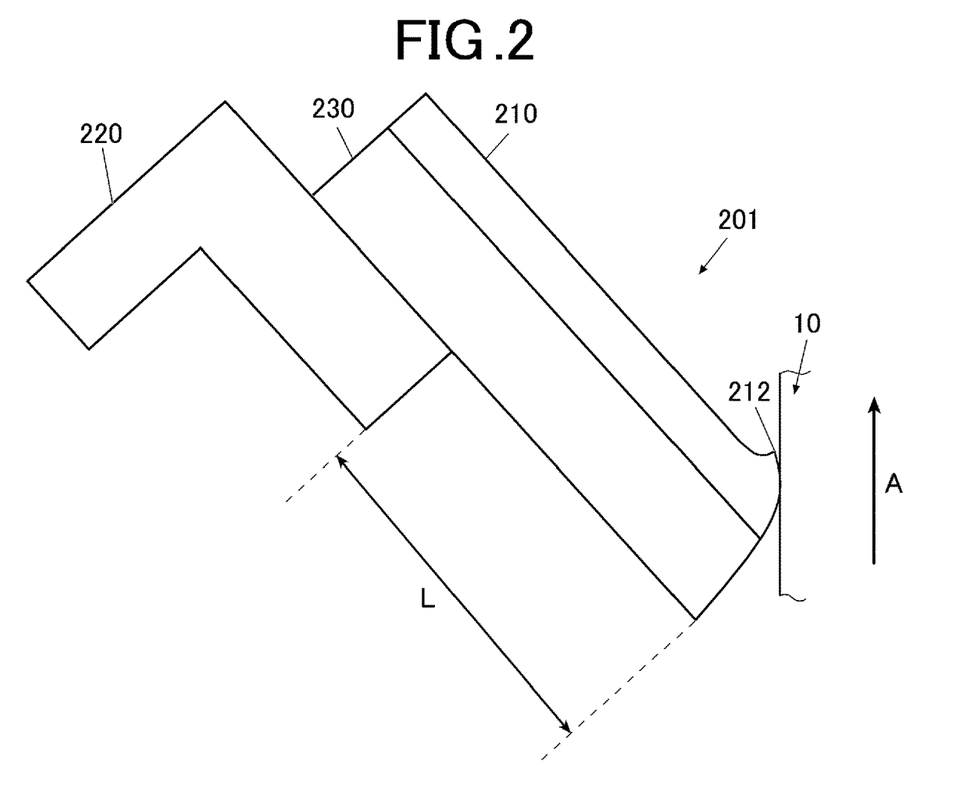
FIG. 2 is a diagram schematically showing a situation of a cleaning blade that is in contact with a surface of an image carrier.

FIG. 1 is a schematic perspective view of a configuration of a cleaning blade, and FIG. 2 is a diagram schematically showing a situation of a cleaning blade that is in contact with a surface of an image carrier.

As shown in FIGS. 1 and 2, the cleaning blade 201 of the present invention includes a contact layer 210 that is in contact with the toner image carrier and a support layer 230 that joins to a support member 220. That is, the contact layer 210 is in contact with the surface of the photoreceptor (toner image carrier 10), and the contact layer 210 is interposed between the support layer 230 and the surface of the photoreceptor.

The contact layer 210 has a flat plate shape and is arranged so as to be in contact with the surface of the cleaning target (for example, the toner image carrier 10) at a predetermined pressure.

The support member 220 is a member that supports the contact layer 210, and the support member 220 and the contact layer 210 are joined by the support layer 230.

The support member 220 has an L-shaped cross section in FIGS. 1 and 2, but may have any other shape.

<Contact Layer>

The contact layer contains, for example, polyurethane or the like. Among these, it is preferable to have flexibility to follow and adhere to the unevenness of the surface of the image carrier at the cleaning nip, and further to have an appropriate strength in order to reduce wear due to scraping, and it is preferable to be made of polyurethane rubber from the viewpoint of dimensional accuracy of the edge and the like.

The contact layer made of polyurethane rubber can be produced by a known technique. For example, an contact layer made of polyurethane rubber can be produced by preparing a polyurethane prepolymer using a polyol and a polyisocyanate, adding a crosslinking agent or the like to the polyurethane prepolymer, crosslinking the polyurethane prepolymer in a predetermined mold, postcrosslinking the polyurethane prepolymer in a furnace, forming the polyurethane prepolymer into a sheet by centrifugal forming, allowing the obtained sheet to stand in a ambient temperature to mature, and cutting the sheet into a flat plate shape with a predetermined dimension.

The thickness of the contact layer according to the present invention is preferably thinner than the thickness of the support layer, and the thickness of the support layer is preferably in a range of 2 to 6 times the thickness of the contact layer as described later.

Specifically, the thickness of the contact layer is preferably in a range of 200 to 700 μm, and the thickness of the support layer is preferably in a range of 1200 to 2000 μm.

The thickness of the contact layer and the support layer can be measured using, for example, a microscope VHX-600 (manufactured by Keyence Corporation).

<Support Layer>

The support layer contains an inorganic filler having a thermal conductivity (λ) of 30 [W/mK] or more. Such inorganic fillers are as described above.

It is preferable that the support layer is made of polyurethane rubber in that it contains the inorganic filler, has flexibility as well as the contact layer, and has an appropriate strength.

The support layer made of polyurethane rubber can also be produced by a known technique in the same manner as the above-described contact layer, and it is preferable to use, for example, the above-described centrifugal forming process.

In this case, it is preferable that the prepared liquid is prepared by first adding the formulation liquid for forming the support layer and then adding the prescribed liquid for forming the contact layer. By adding the respective formulation liquids in this order, the content ratio of the inorganic filler contained in the support layer is higher on the surface side (the surface opposite to the interface side with the support layer, that is, the surface on the support member side) than on the interface side with the contact layer, and thus the heat dissipation is improved.

When the support layer is formed, the order is appropriately determined, and usually, a polyurethane prepolymer is prepared using a polyol and a polyisocyanate as a formulation liquid for forming the support layer, and then, the inorganic filler having a thermal conductivity of 30 [W/mK] or more, the crosslinking agent, and the like are added to the polyurethane prepolymer for cross-linking, and then the support layer is formed by centrifugal forming.

<Support Member>

Examples of the support member according to the present invention include a steel plate, a stainless steel (SUS), an aluminium plate, a copper plate, and a phosphor bronze plate.

A distance L from a distal end of the support layer to a distal end of the support member (refer to FIG. 2) is preferably in a range of 5 to 30 mm, and is particularly preferably about 15 mm.

The support layer and the support member are preferably joined (bonded) to each other with, for example, a hot melt adhesive (ethylene-vinyl acetate adhesive, olefin adhesive, polyamide adhesive, polyester adhesive).

[Method for Manufacturing Cleaning Blade]

A method for manufacturing a cleaning blade according to the present invention includes a step for forming a contact layer and a support layer using a centrifugal forming process (a contact layer and a support layer forming step).

Further, it is preferable to include a step for joining (bonding) the support member to the support layer (support member bonding step) after the contact layer and the support layer are formed.

<Contact Layer and Support Layer Forming Step>

The contact layer and the support layer are preferably plate-like members formed by forming urethane rubber.

That is, first, a plate-like member serving as a support layer is formed. Subsequently, a plate-like member serving as a contact layer is formed on the plate-like member of the support layer formed in the mold.

In the above manufacturing method, a plate-like member serving as a support layer is formed and then a plate-like member serving as a contact layer is laminated, but the method for manufacturing the cleaning blade according to the present invention may be a manufacturing method in which a plate-like member serving as a contact layer is formed and then a plate-like member serving as a support layer is laminated. It is preferable to laminate the contact layer after the support layer is formed.

The plate-like members serving as a support layer and a contact layer are formed using a known polyurethane-forming process as described below.

The urethane rubber can be produced by a known method, and general methods of polyurethane, such as a prepolymer method and a one-shot method, are used as the polymerization method. The prepolymer method is suitable for the present embodiment because it provides a polyurethane with excellent in strength and wear resistance, but is not limited by the manufacturing method.

In the manufacturing method of the prepolymer method, for example, the urethane rubber of raw material can be manufactured as a plate-like member by preparing a polyurethane prepolymer using a polyol and a polyisocyanate, adding a crosslinking agent, a chain extender, and, if necessary, a curing catalyst to the polyurethane prepolymer, crosslinking the polyurethane prepolymer in a predetermined mold, post-crosslinking the polyurethane prepolymer in a furnace, forming the polyurethane prepolymer into a sheet by centrifugal forming, allowing the obtained sheet to stand in an ambient temperature to mature, and cutting the sheet into a flat plate shape with a predetermined dimension.

As described above, when the support layer is formed, the inorganic filler having a thermal conductivity of 30 [W/mK] or more is added to the polyurethane prepolymer in addition to the crosslinking agent and the like.

(Polyol)

The polyol may be one or more kinds, and may be appropriately selected depending on the purpose. Examples thereof include a high molecular weight polyol and a low molecular weight polyol.

Examples of the high molecular weight polyol include a polyester polyol which is a condensation product of an alkylene glycol and an aliphatic dibasic acid such as adipic acid, a polycaprolactone-based polyol such as a polycaprolactone ester polyol obtained by ring-opening polymerization of caprolactone, and polyether-based polyols such as poly(oxytetramethylene) glycol and poly(oxypropylene) glycol. Examples of the alkylene glycol include ethylene adipate ester polyol, butylene adipate ester polyol, hexylene adipate ester polyol, ethylene propylene adipate ester polyol, ethylene butylene adipate ester polyol, and ethylene neopentylene adipate ester polyol.

Examples of the low molecular weight polyol include dihydric alcohols such as 1,4-butanediol, ethylene glycol, neopentyl glycol, hydroquinone-bis(2-hydroxyethyl)ether, 3,3'-dichloro-4,4'-diaminodiphenylmethane, and 4,4'-diaminodiphenylmethane, and trihydric or higher polyhydric alcohols such as 1,1,1-trimethylolpropane, glycerin, 1,2,6-hexanetriol, 1,2,4-butanetriol, trimethylolethane, 1,1,1-tris(hydroxyethoxymethyl)propane, diglycerin, and pentaerythritol.

Among the high molecular weight polyols, for example, a polyol obtained by dehydration condensation of a diol and a dicarboxylic acid is preferably used as the polyester polyol.

Examples of commercially available products of the condensed polyol include SANESTER 2610 and SANESTER 2620 (polyethylene adipate diol, Sanyo Chemical Industries, Ltd.), SANESTER 4620 (polytetramethylene adipate diol, Sanyo Chemical Industries, Ltd.), Kuraray polyol P-2010, Kuraray polyol P-3010, and Kuraray polyol P-6010 (poly-3-methyl-1,5-pentaneadipate diol).

Examples of the diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, and 1,14-tetradecanediol. These may be used singly or in combination of two or more.

Examples of the dicarboxylic acid include oxalic acid, malonic acid, succinic acid, methylmalonic acid, glutaric acid, ethylmalonic acid, methylsuccinic acid, adipic acid, propylmalonic acid, ethylsuccinic acid, dimethylsuccinic acid, pimelic acid, butylmalonic acid, diethylmalonic acid, propylsuccinic acid, suberic acid, azelaic acid, sebacic acid, undecanedioic acid, dodecanedioic acid, phthalic acid, and decamethylene dicarboxylic acid. Among these, succinic acid, adipic acid, sebacic acid, decamethylene dicarboxylic acid, and phthalic acid are desirable. These may be used singly or in combination of two or more.

(Polyisocyanate) The polyisocyanate may be one or more kinds, and may be appropriately selected depending on the purpose, and examples thereof include methylene diphenyl diisocyanate (MDI), tolylene diisocyanate (TDI), xylylene diisocyanate (XDI), naphthylene-1,5-diisocyanate (NDI), tetramethyl xylene diisocyanate (TMXDI), isophorone diisocyanate (IPDI), hydrogenated xylylene diisocyanate (H6XDI), dicyclohexylmethane diisocyanate (H12MDI), hexamethylene diisocyanate (HDI), dimer acid diisocyanate (DDI), norbornene diisocyanate (NBDI), and trimethyl hexamethylene diisocyanate (TMDI).

(Crosslinking Agent)

Examples of the crosslinking agent include diol (bifunctional), triol (trifunctional), tetraol (tetrafunctional), and the like, and these may be used in combination. In addition, an amine compound may be used as the crosslinking agent. Those crosslinked using a crosslinking agent having trifunctional or higher are preferable.

The crosslinking agent having trifunctional is not particularly limited, and examples thereof include trimethylolpropane, glycerin, and triisopropanolamine.

As the chain extender, a diol or diamine having a weight-average molecular weight (Mw) of less than 400 may be used, and examples thereof include 1,4-butanediol and the like.

(Curing Catalyst)

The curing catalyst may be one or more kinds, and may be appropriately selected depending on the purpose, and examples thereof include 2-methylimidazole and 1,2-dimethylimidazole. The content of the curing catalyst can be appropriately selected depending on the purpose, and is preferably in a range of 0.01 to 0.5% by mass, and more preferably in a range of 0.05 to 0.3% by mass.

<Support Member Joining Step>

In the support member joining step, the support member is joined to the support layer of the laminated body of the support layer and the contact layer obtained above using an adhesive.

The adhesive is as described above.

[Applications]

The cleaning blade of the present invention can be used for an electrophotographic applications, an application for inkjet printers, and the like.

As an electrophotographic application, the cleaning blade of the present invention can be applied to a cleaning blade for a photoreceptor or a cleaning blade for an intermediate transfer belt.

The cleaning blade for an electrophotographic application is preferably plate shape, and a hardness of the contact layer is preferably 60 to 80 degrees, and more preferably 65 to 75 degrees in JIS-A hardness. When the hardness is 60 degrees or more, the cleaning blade has an appropriate rigidity, and extension caused by being pulled at the contact part can be suppressed, and cracks and breakage can be suppressed, so that the life of the cleaning blade can be extended.

When the hardness is 80 degrees or less, the adhesiveness of the blade to the counterpart material (in this case, the image carrier) is ensured as compared with the case where the hardness is greater than 80 degrees, so that the risk of remaining of wiping can be reduced.

The repulsion elasticity of the contact layer is preferably 10 to 80%, more preferably 10 to 50%, in terms of the modulus of repulsion elasticity measured at 25° C.

When the repulsion elasticity is 10% or more, the cleaning blade has an appropriate restoring force, and extension caused by being pulled at the contact part is suppressed, and cracks and breakage can be suppressed, so that the life of the cleaning blade can be extended.

When the repulsion elasticity is 80% or less, the adhesiveness of the blade to the counterpart material (in this case, the image carrier) is ensured as compared with the case where the repulsion elasticity is greater than 80%, so that the risk of remaining of wiping can be reduced.

The hardness and the repulsion elasticity can be adjusted by the kind of the material of the cleaning blade (plate-like member), the addition ratio thereof, and the like, respectively.

[Image Forming Apparatus]

The image forming apparatus of the present invention includes the above-described cleaning blade of the present invention.

As shown in FIG. 2, the cleaning blade of the present invention can be used as a member for removing adhering substances from the surface of the image carrier (photoreceptor drum) 10 by contacting the surface of the image carrier 10 at least with the edge 212 of the contact layer 201. That is, the cleaning blade of the present invention can be used as a cleaning blade for a blade cleaning system in an image forming in an electrophotographic system.

The image forming of the electrophotographic system can be performed by a known electrophotographic image forming device having an image carrier for loading and transferring a toner image, and a cleaning blade for removing toner particles remaining on the surface of the image carrier by contacting the surface of the image carrier after the toner image has been transferred by the image carrier.

Note that the edge 212 may have a length that sufficiently contacts the entire length of the surface of the image carrier 10 in the axial direction, and may be, for example, a corner (one side edge) in a cross-sectional shape that crosses the longitudinal direction of the contact layer 210.

The cleaning blade 201 of the present invention is used as a cleaning blade in a known electrophotographic image forming apparatus by being brought into contact with the image carrier 10 at the edge 212.

Figure 3:
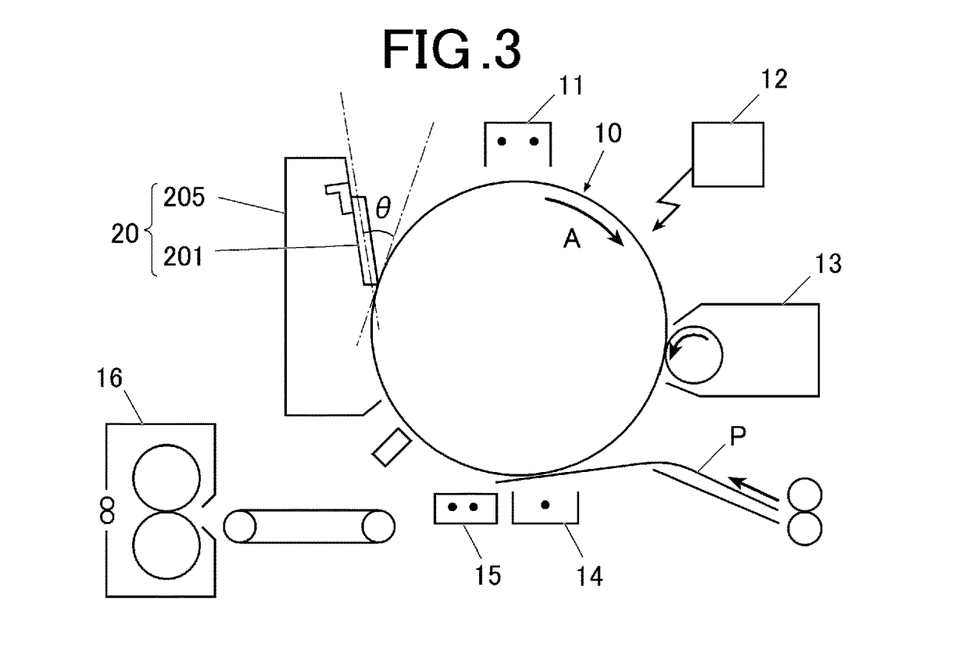
FIG. 3 is a diagram schematically showing an embodiment of an image forming apparatus according to the present invention.

FIG. 3 is a diagram schematically illustrating an embodiment of an image forming apparatus according to the present invention. As shown in FIG. 3, the image forming apparatus according to the present invention includes: a drum-shaped image carrier 10 rotatably disposed in the direction of an arrow A; a charging device 11 for charging a surface of the image carrier 10; an exposure device 12 for exposing a surface of the charged image carrier 10 to form an electrostatic latent image; a developing device 13 for actualizing an electrostatic latent image by a developer including toner particles to form a toner image; a transfer device 14 for transferring the toner image formed on the image carrier 10 to the transfer material P; a separation device 15 for separating the transfer material P after being transferred from the image carrier 10; a cleaning device 20 for removing the toner particles remaining on the image carrier 10 after transfer; and a fixing device 16 for fixing an unfixed toner image on the transfer material P to the transfer material P. The charging device 11, the exposure device 12, the developing device 13, the transfer device 14, the separation device 15, and the cleaning device 20 are arranged on the outer periphery of the image carrier 10 in this order along the direction of an arrow A.

The cleaning device 20 includes a cleaning container 205 that opens toward the image carrier 10, and a cleaning blade

201 of the present invention that is in contact with the surface of the image carrier 10 and is supported by an opening of the cleaning container 205.

The cleaning blade 201 is supported by the opening with a support member 220 at its proximal end so that the distal end of the contact layer 210 is in contact with the surface of the image carrier 10. The direction extending from the proximal end of the cleaning blade 201 with respect to the image carrier 10 is a direction opposite to the rotational direction of the image carrier 10 (the direction in which the surface moves), the so-called counter direction.

As shown in FIG. 1, the cleaning blade 201 includes a contact layer 210, a support layer 230, and a support member 220, and the contact layer 210 includes an edge 212.

As shown in FIG. 2, the cleaning blade 201 is arranged to press against the surface of the image carrier 10 at the edge 212.

The pressing force of the cleaning blade 201 against the image carrier 10 is preferably in a range of 14 to 35 N/m, and more preferably in a range of 17 to 30 N/m. When the pressing force is 14 N/m or more, a slipping-through of the toner particles due to the lack of the pressing force does not easily occur. When the pressing force is 35 N/m or less, the stress applied to the contact layer of the blade can be reduced, and cracks due to stress concentration can be suppressed, so that the wear reduction can be sufficiently achieved.

The contact angle of the cleaning blade 201 with respect to the surface of the image carrier 10 is preferably in a range of 10 to 30 degrees, and more preferably in a range of 12 to 27 degrees in the rigid body contact angle. In general, the edge 212 is retracted in the rotational direction (the direction of an arrow A), thereby an appropriate cleaning nip is formed. Therefore, if the contact angle is 12 degrees or more, the slipping-through of the toner particles does not occur, and if the contact angle is 27 degrees or less, the amount of retraction of the cleaning blade in the sliding direction does not increase and the extension and the bending of the contact layer 210 do not increase, so that the wear reduction can be sufficiently achieved.

The rigid body contact angle is an angle ($\theta$ in FIG. 3) formed by the extending direction of the cleaning blade 201 and a tangent line of an image carrier 10 at a position where the cleaning blade 201 is in contact with the surface of the image carrier 10, when the cleaning blade 201 is regarded as a rigid body.

The image carrier 10 is charged by the charging device 11, and an electrostatic latent image is formed on the surface of the charged image carrier 10 by exposure to the surface by the exposure device 12. The electrostatic latent image is actualized by the supply of the toner particles of the developing device 13, and becomes a toner image. The toner image formed on the image carrier 10 is transferred to the transfer material P by the transfer device 14. The transfer material P for carrying the toner image is separated from the surface of the image carrier 10 by application of a voltage from the separation device 15. The toner image on the transfer material P is fixed to the transfer material P by heating and pressing by the fixing device 16.

In the image forming method using the image forming apparatus, known toner particles having an external additive can be used as a developer. The developer may be a one-component developer substantially composed of only toner particles, or may be a two-component developer including toner particles and carrier particles.

The toner particles include, for example, toner base particles containing a binder resin and a colorant, and an external additive that adheres to the surface of the toner base particles. The toner base particles can be appropriately configured based on a known technique in accordance with an image to be formed in the image forming method.

The external additive is particles exhibiting a function of improving the characteristics of the toner particles such as fluidity and charging characteristics, and can be appropriately selected from known particles. The external additive may be one or more, and examples of which include inorganic fine particles, organic fine particles, and lubricants.

Examples of the inorganic fine particles preferably include fine particles of silica, titania, alumina, or strontium titanate. The surface of the inorganic fine particles may be subjected to a hydrophobic treatment, if necessary.

Examples of the silica fine particles include commercial products R-805, R-976, R-974, R-972, R-812, and R-809 manufactured by Nippon Aerosil Co., Ltd., and commercial products TS-720, TS-530, TS-610, H-5, and MS-5 manufactured by Cabot Corporation.

Examples of the titania fine particles include commercial products T-805 and T-604 manufactured by Nippon Aerosil Co., Ltd., commercial products MT-100S, MT-100B, MT-500BS, MT-600, MT-600SS, and JA-1 manufactured by Tayca Corporation, commercial products TA-300SI, TA-500, TAF-130, TAF-510, and TAF-510T manufactured by Fuji Titanium Industry Co., Ltd., and commercial products IT-S, IT-OA, IT-OB, and IT-OC manufactured by Idemitsu Kosan Co., Ltd.

Examples of the alumina fine particles include commercial products RFY-C and C-604 manufactured by Nippon Aerosil Co., Ltd., and a commercial product TTO-55 manufactured by Ishihara Sangyo Kaisha, Ltd.

Examples of the organic fine particles include organic fine particles having a number average primary particle diameter of about 10 to 2000 nm. Examples of the material of the organic fine particles preferably include homopolymers of styrene, methyl methacrylate, or the like, and copolymers thereof.

Examples of the lubricants include particles of metal salts of higher fatty acids, and examples of the metal salts of higher fatty acids include zinc salts, aluminum salts, copper salts, magnesium salts, and calcium salts of stearic acids; zinc salts, manganese salts, iron salts, copper salts, and magnesium salts of oleic acids; zinc salts, copper salts, magnesium salts, and calcium salts of palmitic acids; zinc salts and calcium salts of linoleic acids; and zinc salts and calcium salts of ricinoleic acids.

The content of the external additive in the toner particles is preferably 0.1 to 10.0% by mass. The toner particles can be formed by mixing the toner base particles and the external additive using a known mixing device such as Turbula mixer, Henschel mixer, Nauta mixer, and V-type mixer.

Example

Hereinafter, the present invention will be described in detail with reference to Examples, but the present invention is not limited thereto. In Examples below, unless otherwise specified, the process was performed at room temperature (25° C.). Unless otherwise specified, "%" and "part" mean "% by mass" and "part by mass", respectively.

[Preparation of Master Solution Containing Inorganic Filler]

The master solutions 1 to 8 containing an inorganic filler (hereinafter, simply referred to as "master solutions") which contain 25% by mass of the inorganic filler shown in Table 1 below were prepared as follows.

(Table 1)

TABLE 1

| Master Solution No. | Type | Filler system | Inorganic filler Thermal conductivity λ [W/mK] | Average particle diameter [μm] |
|---|---|---|---|---|
| 1 | SiC | Non-oxide filler | 130 | 1.2 |
| 2 | $Si_3N_4$ | Non-oxide filler | 40 | 0.5 |
| 3 | AlN | Non-oxide filler | 150 | 1.0 |
| 4 | h-BN | Non-oxide filler | 35 | 0.2 |
| 5 | $Al_2O_3$ | Oxide filler | 30 | 3.5 |
| 6 | SiC | Non-oxide filler | 130 | 6.0 |
| 7 | $Al_2O_3$ | Oxide filler | 30 | 0.06 |
| 8 | ZnO | Oxide filler | 25 | 0.1 |

The thermal conductivity and the average primary particle diameter of the inorganic filler were calculated by a calculation method described later, and are shown in Table 1.

<Preparation of Master Solution 1>

Silicon carbide (SiC) filler (Shinano Electric Refining Co., Ltd.) was added to polyethylene adipate polyol (SANESTER 2620, manufactured by Sanyo Chemical Industries, Ltd.), and agitated with a mixer (Awatori Rentaro ARV-310, manufactured by Thinky Corporation), to prepare the master solution 1 containing 25% by mass of silicon carbide.

<Preparation of Master Solution 2>

The master solution 2 was prepared in the same manner as the master solution 1 except that the filler was changed to silicon nitride ($Si_3N_4$) (manufactured by Kojundo Chemical Laboratory Co., Ltd.).

<Preparation of Master Solution 3>

The master solution 3 was prepared in the same manner as the master solution 1 except that the filler was changed to aluminum nitride (AlN) (manufactured by Tokuyama Corporation).

<Preparation of Master Solution 4>

The master solution 4 was prepared in the same manner as the master solution 1 except that the filler was changed to hexagonal boron nitride (h-BN) (manufactured by Showa Denko Co., Ltd.).

<Preparation of Master Solution 5>

The master solution 5 was prepared in the same manner as the master solution 1 except that the filler was changed to alumina ($Al_2O_3$) (manufactured by Sumitomo Chemical Co., Ltd.).

<Preparation of Master Solution 6>

The master solution 6 was prepared in the same manner as the master solution 1 except that the filler particle diameter was different.

<Preparation of Master Solution 7>

The master solution 7 was prepared in the same manner as the master solution 5 except that the filler particle diameter was different.

<Preparation of Master Solution 8>

The master solution 8 was prepared in the same manner as the master solution 1 except that the filler was changed to zinc oxide (manufactured by Sumitomo Osaka Cement Co., Ltd.).

[Production of Urethane Rubber]

<Production of Urethane Rubber 1>

Polyethylene adipate polyol 1 (SANESTER 2620, manufactured by Sanyo Chemical Industries, Ltd.) was added to the master solution 1, and the mixture was stirred under reduced pressure using the above-described mixer, followed by defoaming. The mixture was reacted with 4,4'-diphenylmethane diisocyanate (Millionate MT, manufactured by Nippon Polyurethane Industry Co., Ltd.) (referred to as "MDI" in Tables below) at 70° C. for 3 hours under a nitrogen atmosphere to obtain a liquid prepolymer for a support layer.

The liquid prepolymer for a support layer was mixed by adding 1,4-butanediol (B0680, manufactured by Tokyo Chemical Industry Co., Ltd.) as a chain extender and 1,1,1-trimethylolpropane (B0680, manufactured by Tokyo Chemical Industry Co., Ltd.) as a crosslinking agent at a temperature of 100 to 110° C., and then the liquid mixture was injected into a centrifugal molding machine having a drum temperature of 150° C. and cured for 5 minutes. Thus, a support layer was formed.

Subsequently, a liquid prepolymer for a contact layer was prepared in the same manner as the preparation of the liquid prepolymer for a support layer, except that polyethylene adipate polyol 1 (SANESTER 2620, manufactured by Sanyo Chemical Industries, Ltd.) was replaced with polyethylene adipate polyol 2 (SANESTER 2610, manufactured by Sanyo Chemical Industries, Ltd.) and the master solution 1 was not used. Then, the liquid prepolymer for a contact layer was mixed by adding a chain extender and a crosslinking agent, and then injected onto the support layer of the centrifugal molding machine having a drum temperature of 150° C. and cured for 55 minutes to form a contact layer. Thereafter, a laminated plate-shaped polyurethane molded product (a molded product having a contact layer formed on a support layer) was obtained from the drum. It was further aged at room temperature for 1 week and then cut into a size of 2 mm×13 mm×350 mm to obtain the urethane rubber 1.

The addition amount (parts by mass) of each material constituting the support layer and the contact layer is as shown in Table 2 below. The addition amount of the polyol contained in the contact layer was defined as 100 parts by mass, and the mass parts of the other materials were relatively expressed based on this.

Further, each material was injected into the centrifugal molding machine so as to have a predetermined thickness of the support layer and the contact layer described in Table 2.

<Production of Urethane Rubbers 2 to 13>

The urethane rubbers 2 to 13 were prepared in the same manner as the preparation of the urethane rubber 1, except that the master solution, polyol, 4,4'-diphenylmethane diisocyanate (MDI), the chain extender, and the crosslinking agent were changed to the proportions shown in Tables 2 and 3 below.

The urethane rubber 11 is a monolayer plate-shaped polyurethane molded product.

Terms described in Tables 2 and 3 below are as follows.
MDI: 4,4'-diphenylmethane diisocyanate
1,4-BD: 1,4-butanediol
1,1,1-TMP: 1,1,1-trimethylolpropane
Polyol 1: Polyethylene adipate polyol 1 (SANESTER 2620, manufactured by Sanyo Chemical Industries, Ltd.)
Polyol 2: Polyethylene adipate polyol 2 (SANESTER 2610, manufactured by Sanyo Chemical Industries, Ltd.)

<Thermal Conductivity (λ)>

A value measured with a commercially available thermal conductivity measuring device was used as the thermal conductivity of the inorganic filler particles, and LF/TCM FA8510B laser flash method thermal constant measuring device (manufactured by Rigaku Corporation) was used as the device and determined in accordance with JIS R1611 (flash method).

A laser having the pulse width of 0.5 msec was used as the irradiated laser, the thermal response in the back surface of the sample was detected by the infrared detector, the thermal diffusivity of the sample was obtained by the half-time method, and the specific heat was obtained by the extrapolation method.

The measurement sample was shaped like a disk with a diameter of 10 mm and a thickness of 2 mm using a compression molding machine. The density was measured by the substitution method in water. The thermal conductivity ($\lambda$) was calculated using the sample density ($\rho$), the specific heat (Cp), and the thermal diffusivity ($\alpha$) with the following equation. Note that the values in 300 K are used for all values.

Thermal conductivity calculation equation: $\lambda = \rho \times Cp \times \alpha$ <Average Primary Particle Diameter>

The average particle diameter (number average primary particle diameter) of the particles of the inorganic filler was measured by observing a cross section of a support layer with an electron microscope after the support layer was formed. Specifically, a cross section of the support layer was photographed by a scanning potential microscope (for example, "JSM-7401F" (manufactured by JEOL Ltd.)) at a magnification of 40,000 times, and 100 particles other than the aggregated particles were randomly taken into the scanner. The obtained photographic images were analyzed using an automatic image-processing analyzer (LUZEX AP (manufactured by Nireco Corporation)) to determine the particle diameter as (long diameter+short diameter)/2, and the average of 100 particles was defined as the number average primary particle diameter of the inorganic filler.

"Particle content [% by mass]" described in Tables 2 and 3 represents the content of the inorganic filler in the support layer.

[Evaluation]

Each urethane rubber produced as described above was joined to a sheet metal to manufacture cleaning blades 1 to 13. As the sheet metal, the same sheet metal used for the cleaning blade mounted on the drum unit of Bizhub Press C1100 was used.

The drum unit of the image forming apparatus "Bizhub Press C1100" (manufactured by Konica Minolta, Inc., "bizhub" is a registered trademark of Konica Minolta, Inc.) was removed, and the cleaning blade integrated part mounted as the standard was replaced with each cleaning blade manufactured as described above. The drum unit is mounted on the image forming apparatus.

When the contact load of the cleaning blade was set to 26 N/m and the rigid body contact angle was set to 20 degrees, and when the contact load of the cleaning blade was set to 38 N/m and the rigid body contact angle was set to 25 degrees, the following evaluations were performed.

<Filming, and Remaining of Wiping>

An image chart with a printing ratio of 0.5% was continuously printed on both sides of 100,000 sheets of A3 size. More specifically, the image chart having a 2.1 mm width band in a direction perpendicular to the conveyance direction was used. The temperature and humidity conditions at the time of printing were high temperature and high humidity conditions (temperature: 30° C., humidity: 80% RH).

After the printing, the drum unit of the image forming apparatus described above was taken out, and the surface of the photoreceptor and the surface of the printed matter were observed visually or with a magnifying glass to confirm the presence or absence of unwiped part in which toner was present in streaks on the surface of the photoreceptor and the printed matter. The evaluation was made according to the following criteria, and AA and A were regarded as acceptable.

(Evaluation Criteria)
AA: No unwiped part is observed on both the image and the photoreceptor.
A: There is no unwiped part on the image, but foreign matter adheres to the photoreceptor.
B: There are unwiped parts clearly on the image.

<Chipping and Fracture>

In the cleaning blade after the printing described above, the presence or absence of fracture and chipping of the edge was confirmed by observation with a laser microscope. The evaluation was made according to the following criteria, and AA and A were regarded as acceptable.

(Evaluation Criteria)
AA: No fracture or chipping existed on the blade.
A: Fracture or chipping existed on the blade, but it was small. (It was not confirmed in the image, and there was no actual damage.)
B: Fracture or chipping existed on the blade, and it was confirmed in the image.

(Table 2)

TABLE 2

|  |  | Cleaning blade 1 Urethane rubber 1 | | Cleaning blade 2 Urethane rubber 2 | | Cleaning blade 3 Urethane rubber 3 | | Cleaning blade 4 Urethane rubber 4 | |
| --- | --- | --- | --- | --- | --- | --- | --- | --- | --- |
| Support layer | Prepolymer [parts by mass] | Master solution 1 Polyol 1 MDI | 12 91 40 | Master solution 1 Polyol 1 MDI | 60 55 40 | Master solution 1 Polyol 1 MDI | 60 55 40 | Master solution 1 Polyol 1 MDI | 80 40.0 40 |
|  | Chain extender [parts by mass] | 1,4-BD | 5.2 | 1,4-BD | 5.2 | 1,4-BD | 5.2 | 1,4-BD | 5.2 |
|  | Crosslinking agent [parts by mass] | 1,1,1-TMP | 3.5 | 1,1,1-TMP | 3.5 | 1,1,1-TMP | 3.5 | 1,1,1-TMP | 3.5 |
|  | Particle content [% by mass] |  | 2.0 |  | 9.2 |  | 9.2 |  | 11.9 |
| Contact layer | Prepolymer [parts by mass] | Polyol 2 MDI | 100 40 | Polyol 2 MDI | 100 40 | Polyol 1 MDI | 100 40 | Polyol 2 MDI | 100 40 |
|  | Chain extender [parts by mass] | 1,4-BD | 5.2 | 1,4-BD | 5.2 | 1,4-BD | 5.2 | 1,4-BD | 5.2 |
|  | Crosslinking agent [parts by mass] | 1,1,1-TMP | 3.5 | 1,1,1-TMP | 3.5 | 1,1,1-TMP | 3.5 | 1,1,1-TMP | 3.5 |
|  | Tan δ peak temperature [° C.] | 1 | | 1 | | −6 | | 1 | |
| Thickness of Support layer T2 + Thickness of Contact layer T1 [mm] | | 1.5 + 0.5 = 2.0 | | 1.6 + 0.4 = 2.0 | | 1.6 + 0.4 = 2.0 | | 1.6 + 0.4 = 2.0 | |

TABLE 2-continued

|  |  |  |  |  |  |  |
|---|---|---|---|---|---|---|
| Thickness of Support layer/ Thickness of Contact layer [times] |  |  | 3 | 4 | 4 | 4 |
| Evaluation | Filming, Remaining of wiping | Load 26 N/m | A | AA | A | AA |
|  |  | Load 38 N/m | A | AA | AA | AA |
|  | Chipping, Fracture | Load 26 N/m | AA | AA | AA | AA |
|  |  | Load 38 N/m | AA | AA | AA | A |
| Remarks |  |  | Present invention | Present invention | Present invention | Present invention |

|  |  |  | Cleaning blade 5 Urethane rubber 5 |  | Cleaning blade 6 Urethane rubber 6 |  | Cleaning blade 7 Urethane rubber 7 |  |
|---|---|---|---|---|---|---|---|---|
| Support layer | Prepolymer [parts by mass] | | Master solution 2 | 60 | Master solution 3 | 60 | Master solution 3 | 120 |
|  |  | | Polyol 1 | 55 | Polyol 1 | 55 | Polyol 1 | 10 |
|  |  | | MDI | 40 | MDI | 40 | MDI | 40 |
|  | Chain extender [parts by mass] | | 1,4-BD | 5.2 | 1,4-BD | 5.2 | 1,4-BD | 5.2 |
|  | Crosslinking agent [parts by mass] | | 1,1,1-TMP | 3.5 | 1,1,1-TMP | 3.5 | 1,1,1-TMP | 3.5 |
|  | Particle content [% by mass] | | 9.2 | | 9.2 | | 16.8 | |
| Contact layer | Prepolymer [parts by mass] | | Polyol 2 | 100 | Polyol 2 | 100 | Polyol 2 | 100 |
|  |  | | MDI | 40 | MDI | 40 | MDI | 40 |
|  | Chain extender [pasta by mass] | | 1,4-BD | 5.2 | 1,4-BD | 5.2 | 1,4-BD | 5.2 |
|  | Crosslinking agent [parts by mass] | | 1,1,1-TMP | 3.5 | 1,1,1-TMP | 3.5 | 1,1,1-TMP | 3.5 |
|  | Tan δ peak temperature [° C.] | | 1 | | 1 | | 1 | |
| Thickness of Support layer T2 + Thickness of Contact layer T1 [mm] | | | 1.6 + 0.4 = 2.0 | | 1.5 + 0.5 = 2.0 | | 1.5 + 0.5 = 2.0 | |
| Thickness of Support layer/ Thickness of Contact layer [times] | | | 4 | | 3 | | 3 | |
| Evaluation | Filming, Remaining of wiping | Load 26 N/m | A | | AA | | AA | |
|  |  | Load 38 N/m | AA | | AA | | AA | |
|  | Chipping, Fracture | Load 26 N/m | AA | | AA | | A | |
|  |  | Load 38 N/m | A | | AA | | A | |
| Remarks | | | Present invention | | Present invention | | Present invention | |

Polyol 1: SANESTER 2620
Polyol 2: SANESTER 2610
MDI: 4,4'-Diphenylmethane diisocyanate
1,4-BD: 1,4-butanediol
1,1,1-TMP: 1,1,1-trimethylolpropane

TABLE 3

|  |  |  | Cleaning blade 8 Urethane rubber 8 |  | Cleaning blade 9 Urethane rubber 9 |  | Cleaning blade 10 Urethane rubber 10 |  |
|---|---|---|---|---|---|---|---|---|
| Support layer | Prepolymer [parts by mass] | | Master solution 4 | 60 | Master solution 5 | 60 | Master solution 6 | 60 |
|  |  | | Polyol 1 | 55 | Polyol 1 | 55 | Polyol 1 | 55 |
|  |  | | MDI | 40 | MDI | 40 | MDI | 40 |
|  | Chain extender [parts by mass] | | 1,4-BD | 5.2 | 1,4-BD | 5.2 | 1,4-BD | 5.2 |
|  | Crosslinking agent [parts by mass] | | 1,1,1-TMP | 3.5 | 1,1,1-TMP | 3.5 | 1,1,1-TMP | 3.5 |
|  | Particle content [% by mass] | | 9.2 | | 9.2 | | 9.2 | |
| Contact layer | Prepolymer [parts by mass] | | Polyol 2 | 100 | Polyol 2 | 100 | Polyol 2 | 100 |
|  |  | | MDI | 40 | MDI | 40 | MDI | 40 |
|  | Chain extender [parts by mass] | | 1,4-BD | 5.2 | 1,4-BD | 5.2 | 1,4-BD | 5.2 |
|  | Crosslinking agent [parts by mass] | | 1,1,1-TMP | 3.5 | 1,1,1-TMP | 3.5 | 1,1,1-TMP | 3.5 |
|  | Tan δ peak temperature [° C.] | | 1 | | 1 | | 1 | |
| Thickness of Support layer T2 + Thickness of Contact layer T1 [mm] | | | 1.4 + 0.6 = 2.0 | | 1.5 + 0.5 = 2.0 | | 1.5 + 0.5 = 2.0 | |
| Thickness of Support layer/ Thickness of Contact layer [times] | | | 2.3 | | 3 | | 3 | |
| Evaluation | Filming, Remaining of wiping | Load 26 N/m | A | | A | | B | |
|  |  | Load 38 N/m | A | | A | | A | |
|  | Chipping, Fracture | Load 26 N/m | AA | | A | | A | |
|  |  | Load 38 N/m | A | | A | | B | |
| Remarks | | | Present invention | | Present invention | | Comparative Example | |

TABLE 3-continued

|  |  | Cleaning blade 11<br>Urethane rubber 11 |  | Cleaning blade 12<br>Urethane rubber 12 |  | Cleaning blade 13<br>Urethane rubber 13 |  |
|---|---|---|---|---|---|---|---|
| Support layer | Prepolymer [parts by mass] | Master solution 1<br>Polyol 1<br>MDI | 60<br>55<br>40 | Master solution 7<br>Polyol 1<br>Polyol 1 | 60<br>55<br>40 | Master solution 8<br>Polyol 1<br>MDI | 60<br>55<br>40 |
|  | Chain extender [parts by mass] | 1,4-BD | 5.2 | 1,4-BD | 5.2 | 1,4-BD | 5.2 |
|  | Crosslinking agent [parts by mass] | 1,1,1-TMP | 3.5 | 1,1,1-TMP | 3.5 | 1,1,1-TMP | 3.5 |
|  | Particle content [% by mass] |  | 9.2 |  | 9.2 |  | 9.2 |
| Contact layer | Prepolymer [parts by mass] | — |  | Polyol 2 | 100 | Polyol 2 | 100 |
|  |  | — |  | MDI | 40 | MDI | 40 |
|  | Chain extender [parts by mass] | — |  | 1,4-BD | 5.2 | 1,4-BD | 5.2 |
|  | Crosslinking agent [parts by mass] | — |  | 1,1,1-TMP | 3.5 | 1,1,1-TMP | 3.5 |
|  | Tan δ peak temperature [° C.] |  | 1 |  | 1 |  | 1 |
| Thickness of Support layer T2 + Thickness of Contact layer T1 [mm] |  | Monolayer 2.0 |  | 1.6 + 0.4 = 2.0 |  | 1.5 + 0.5 = 2.0 |  |
| Thickness of Support layer/ Thickness of Contact layer [times] |  | — |  | 4 |  | 3 |  |
| Evaluation | Filming, Load 26 N/m | B |  | B |  | B |  |
|  | Remaining Load 38 N/m of wiping | B |  | B |  | B |  |
|  | Chipping, Load 26 N/m | B |  | A |  | B |  |
|  | Fracture Load 38 N/m | B |  | B |  | B |  |
| Remarks |  | Comparative Example |  | Comparative Example |  | Comparative Example |  |

Polyol 1: SANESTER 2620
Polyol 2: SANESTER 2610
MDI: 4,4'-Diphenylmethane diisocyanate
1,4-BD: 1,4-butanediol
1,1,1-TMP: 1,1,1-trimethylolpropane As shown in the above results, it can be seen that cleaning blades of the present invention are superior in the cleaning quality and do not cause fracture or chipping as compared with cleaning blades of the comparative examples.

According to the above means of the present embodiment, it is possible to provide a cleaning blade, a method for manufacturing the cleaning blade and an image forming apparatus that are capable of reducing an increase in vibration, further stabilizing the cleaning quality, and preventing breakage of an edge, by reducing an increase in temperature due to rubbing of the edge.

The expression mechanism of the effect or function mechanism of the present embodiment have not been clarified, but they are presumed as follows.

In the cleaning blade of the present embodiment, since the contact layer does not contain an inorganic filler and the support layer contains an inorganic filler having a thermal conductivity ($\lambda$) of 30 W/mK or more, the heat dissipation of the cleaning blade itself is enhanced. Therefore, in the contact layer, even if the temperature rises due to friction, the heat is dissipated, and an increase in vibration at the edge due to the temperature rise can be prevented. As a result, softening of the rubber due to heat is suppressed, and the breakage (fracture or chipping) of the edge is prevented, so that the cleaning quality can be stabilized.

In addition, since the inorganic filler having high thermal conductivity is contained in the support layer instead of the contact layer, the toner image carrier in contact with the contact layer is not damaged by the inorganic filler.

Further, in the cleaning blade of the present embodiment, an average particle diameter of the inorganic filler is in a range of 0.1 to 5.0 μm. When the average particle diameter is less than 0.1 μm, its dispersibility with a resin contained in the support layer (for example, a urethane resin or the like) is poor, resulting in poor dispersion. On the other hand, when the average particle diameter is larger than 5.0 μm, particularly when the thickness of the contact layer is thin, contact pressure unevenness in the longitudinal direction occurs, resulting in a cleaning failure. Therefore, by setting the average particle diameter of the inorganic filler in a range of 0.1 to 5.0 μm, good dispersibility can be obtained, and good cleaning property can be obtained without causing contact pressure unevenness in the longitudinal direction.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A cleaning blade comprising:
a contact layer that is in contact with a toner image carrier, and
a support layer that joins to a support member,
wherein the contact layer does not contain an inorganic filler,
wherein the support layer contains an inorganic filler having a thermal conductivity ($\lambda$) of 30 W/mK or more, and an average particle diameter of the inorganic filler is in a range of 0.1 to 5.0 μm.

2. The cleaning blade according to claim 1, wherein the inorganic filler is a non-oxide filler.

3. The cleaning blade according to claim 1, wherein the support layer contains the inorganic filler in a range of 2 to 15% by mass.

4. The cleaning blade according to claim 1, wherein a tan δ peak temperature of the contact layer at a frequency of 1 Hz is in a range of −2° C. to 12° C.

5. The cleaning blade according to claim 1, wherein a thickness of the support layer is in a range of 2 to 6 times a thickness of the contact layer.

6. The cleaning blade according to claim 1, wherein the contact layer and the support layer contain polyurethane.

7. A method for manufacturing the cleaning blade according to claim 1, the method including a step for forming the contact layer and the support layer using a centrifugal forming process.

8. An image forming apparatus includes the cleaning blade according to claim 1.

* * * * *